United States Patent [19]
Maron et al.

[11] Patent Number: 5,902,019
[45] Date of Patent: May 11, 1999

[54] METHOD FOR CONTROLLED BRAKING OF A MOTOR VEHICLE

[75] Inventors: Christof Maron, Gehrden; Hubertus Prinzler, Langenhagen; Thomas Dieckmann, Pattensen, all of Germany

[73] Assignee: Continental Aktiengesellschaft, Hanover, Germany

[21] Appl. No.: 08/841,379

[22] Filed: Apr. 30, 1997

[30] Foreign Application Priority Data

Apr. 30, 1996 [DE] Germany .......................... 196 17 285.3

[51] Int. Cl.⁶ ................................................. B60T 7/00
[52] U.S. Cl. .......................... 303/15; 303/9.71; 303/113.4
[58] Field of Search ...................... 303/9.61, 9.71, 303/15, 20, 113.4, 140, 155, 167–169, 173, 174, 188, 189, DIG. 4; 701/72, 78, 83; 364/426.01, 426.016, 426.023, 426.028

[56] References Cited

U.S. PATENT DOCUMENTS

| | | | |
|---|---|---|---|
| 5,255,962 | 10/1993 | Neuhaus et al. | 703/188 |
| 5,560,690 | 10/1996 | Hattori et al. | 303/116.2 |
| 5,694,321 | 12/1997 | Eckert et al. | 364/426.037 |
| 5,732,379 | 3/1998 | Eckert et al. | 701/83 |
| 5,752,748 | 5/1998 | Schramm et al. | 303/20 |
| 5,772,289 | 6/1998 | Neuhaus et al. | 303/9.69 |

FOREIGN PATENT DOCUMENTS

| | | |
|---|---|---|
| 0439559 | 8/1991 | European Pat. Off. . |
| 4022671 | 1/1992 | Germany . |
| 4030724 | 4/1992 | Germany . |
| 195 00 837 | 7/1996 | Germany . |
| WO91/02668 | 3/1991 | WIPO . |
| WO92/05986 | 4/1992 | WIPO . |

*Primary Examiner*—Chris Schwartz
*Attorney, Agent, or Firm*—Walter Ottesen

[57] ABSTRACT

The invention relates to a method for providing controlled braking of a motor vehicle and a brake system for carrying out the method. The brake system includes a central unit and brake actuators for each wheel of the motor vehicle. The brake actuators are connected to the central unit. In the central unit, a relative braking-force distribution key is computed at time intervals and is transmitted to the brake actuators. With a braking operation, the absolute braking force for the braking operation is computed in each brake actuator from the corresponding component of the relative braking-force distribution key.

5 Claims, 3 Drawing Sheets

METHOD FOR CONTROLLED BRAKING OF A MOTOR VEHICLE

FIELD OF THE INVENTION

The invention relates to a method for controlled braking of a motor vehicle equipped with a brake system which, inter alia, includes a brake pedal by which a pedal signal is generated, a brake actuator for each wheel of the vehicle and a central unit. The central unit is connected to the brake actuators and can transmit data thereto. In the method, each brake actuator is charged during a braking operation with a braking force which is first computed. The invention also relates to a brake system for a motor vehicle.

BACKGROUND OF THE INVENTION

In recent times, brake systems of the brake-by-wire type have been developed for motor vehicles and especially for passenger cars. Such a brake system is, for example, disclosed in German patent publication 4,022,671. This brake system includes a brake-value transducer which is connected to two central modules which, in turn, are connected via a data bus to two wheel modules. The central modules and the wheel modules assigned thereto can exchange data in serial operation via the data busses.

A braking operation can be carried out with the aid of the brake system disclosed in German patent publication 4,022,671 as described below. The brake value inputted by the driver is conducted via the brake-value transducer to the central modules and is here first converted into individual brake values for the individual wheel modules. Thereafter, the individual brake values are conducted from the central modules to the wheel modules via the data busses and, on the basis of the individual brake values, the braking operation at each wheel of the vehicle is initiated by the wheel modules.

Different loads on the wheels can occur, for example, because of driving through a curve and/or because of load. By generating individual brake values, these different wheel loads or the different temperatures of the brakes can be considered so that an overheated brake can be detected and controlled out and yaw moments of the motor vehicle can be compensated. However, data from the individual wheel modules must be transmitted to the central units via the data bus in order to consider the operating parameters of individual wheel brakes. As a consequence thereof, the data busses are "in use" from time to time and no data can be transmitted from the central modules to the wheel modules for initiating a braking operation. This then leads to an unwanted delay of the braking operation.

Furthermore, it is not always guaranteed that the individual brake values, which are transmitted by the central modules, always arrive at the same time at all four wheel modules so that the staggered arrival of the brake values can cause an unwanted pulling of the motor vehicle to one side or the other. Finally, the brake system disclosed in German patent publication 4,022,671 can be characterized as unsafe in that a complete disabling of the brake system can occur in the event that the central module becomes inoperative because, in this case, the pregiven brake value is no longer registered by the central modules and the individual brake values are no longer transmitted from the central modules to the individual wheel modules.

European patent publication 0,439,559 discloses a system having distributed modules which communicate with each other via a serial data bus. With this system, commands can be executed in individual modules without a time delay. For this purpose, commands are transmitted from a central module to other modules via the data bus at any desired time point and the commands are stored in these other modules. The command for executing the stored command is supplied to the modules via separate data lines and the stored command is executed directly after the command is received.

The system disclosed in European patent publication 0,439,559 is, however, not suitable for use in brake systems of the brake-by-wire type because the command generation takes place automatically in the central module as does the command transmission between the central module and the other modules and the storage of the fixed commands takes place in the modules and cannot be influenced by the driver of the motor vehicle. However, a braking operation is precisely such an operation which is intended to be influenced by the driver via a suitable actuation of the brake pedal and is dependent upon a particular situation.

SUMMARY OF THE INVENTION

It is an object of the invention to provide a method for controlled braking of a motor vehicle wherein, on the one hand, the braking operation is initiated directly after actuation of the brake pedal and wherein, on the other hand, a reliable emergency braking of the vehicle is still possible when one or more units of the brake system become disabled. Another object of the invention is to provide a brake system for carrying out the method of the invention.

The method of the invention is for controlled braking of a motor vehicle having a brake system and a plurality of wheels. The brake system includes: a brake pedal and sensor assembly for generating a pedal signal (S); a plurality of brake actuators for corresponding ones of the wheels; a central unit for computing a braking-force distribution key (BS). The method includes the steps of: providing a plurality of computing units corresponding to respective ones of the brake actuators and each of the computing units having therein the braking-force distribution key (BS) and/or a component ($K_i$) from the braking-force distribution key (BS) at each point in time with the component ($K_i$) being assigned to the brake actuator of the particular computing unit; conducting the pedal signal (S) directly to the computing units; computing the braking force in each of the computing units from the component ($K_i$) and the pedal signal (S) for the brake actuator corresponding thereto; and, computing a new braking-force distribution key (BS') at time intervals and transmitting new components ($K_i'$) to corresponding ones of the computing units and replacing the old components ($K_i$) therewith.

The braking-force distribution key is computed in the central unit on the basis of vehicle data (for example, wheel base, position of the center of gravity and the like), the speed, the steering angle, the transverse acceleration and the wheel loads of the vehicle, et cetera.

The electrical brake system of the invention is for a motor vehicle and includes: a brake pedal and sensor assembly for generating a pedal signal (S); a plurality of brake actuator units for corresponding ones of the wheels of the motor vehicle; a central unit for computing a braking-force distribution key (BS); the central unit being connected to each of the brake actuator units for transmitting data thereto; each one of the brake actuator units including: a brake actuator; an overwrite memory wherein the braking-force distribution key (BS) and/or a component ($K_i$) from the braking-force distribution key (BS) can be stored with the component ($K_i$) being assigned to the brake actuator of the one brake actuator unit; and, a computing unit wherein a braking force for the brake actuator is computed from the component ($K_i$)

and the pedal signal (S); and, the central unit being so configured that a new braking-force distribution key (BS') is computed and transmitted or at least a new component ($K_i'$) thereof is transmitted to each of the brake actuator units and replaces the old component ($K_i$).

The basic idea of the invention is that a relative braking-force distribution key is computed in the central unit at any desired time independently of the actuation of the brake system by the driver of the motor vehicle. This relative braking-force distribution key is transmitted to the individual computer units of the brake actuators and is stored there so that, at each time point, a braking-force distribution key is present independently of a braking operation. In a braking operation, the absolute braking force for the corresponding brake actuator is computed from the pedal signal and the corresponding component of the relative braking-force distribution key.

The advantages achieved with the invention are especially seen in that delays are avoided when initiating the braking operation because the pedal signal is conducted directly to the brake actuators via separate signal lines. In this way, delays caused by an overload of the data bus, et cetera, are precluded. Furthermore, an actual braking-force distribution key is always present in the brake actuators when the brake signal arrives so that the computation can take place immediately.

A further advantage of the invention is seen in that a pulling of the motor vehicle to one side or the other is effectively prevented because the signal path of the pedal signal to all brake actuators is the same and the computation of the brake force in the individual brake actuators takes the same amount of time and therefore all brake actuators are activated simultaneously. In addition, the brake system is very reliable with respect to malfunction because even when the central unit malfunctions, a braking operation can be initiated with reduced quality on the basis of the pedal signal which is conducted directly to the brake actuators.

According to another embodiment of the invention, the braking-force distribution key is periodically computed in the central unit and is transmitted to the individual computer units of the brake actuators. The frequency of the computation of the braking-force distribution key is, preferably, in a frequency range of approximately 100 to 1,000 Hertz. The advantage of this embodiment is seen in that (especially at a high frequency) a very up-to-date braking-force distribution key or the corresponding component is always present in the brake actuators.

According to another embodiment of the invention, a new braking-force distribution key is always then computed and transmitted to the individual computer units of the brake actuators when a change of the driving situation of the motor vehicle is determined. For example, such a change can be when any one of the following exceeds a pregiven amount: the speed, the steering angle, the transverse acceleration of the motor vehicle, et cetera.

According to another embodiment of the invention, if a new braking-force distribution key (or the corresponding component) has not been transmitted to each brake actuator within a pregiven time interval, the last stored braking-force distribution key (or the last stored component of the braking-force distribution key), which has been assigned to the computing unit of the brake actuator, is replaced by a fixed pregiven value in each computing unit of each brake actuator. This embodiment of the invention affords the advantage that even when the central unit becomes disabled, a braking-force distribution key can be stored in the computing units of the individual brake actuators which still permits an emergency braking of excellent quality. For example, a braking-force distribution key can be stored which provides 35/100 of the braking force to be controlled for the two forward wheels and 15/100 of the braking force to be controlled for the two rearward wheels. In this case, 70% of the braking force is allocated to the front wheels, and only 30% of the braking force is allocated to the rear wheels so that an early blocking of the rear wheels is effectively precluded which would otherwise, as a rule, lead to a dangerous deviation of the motor vehicle from its desired path.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
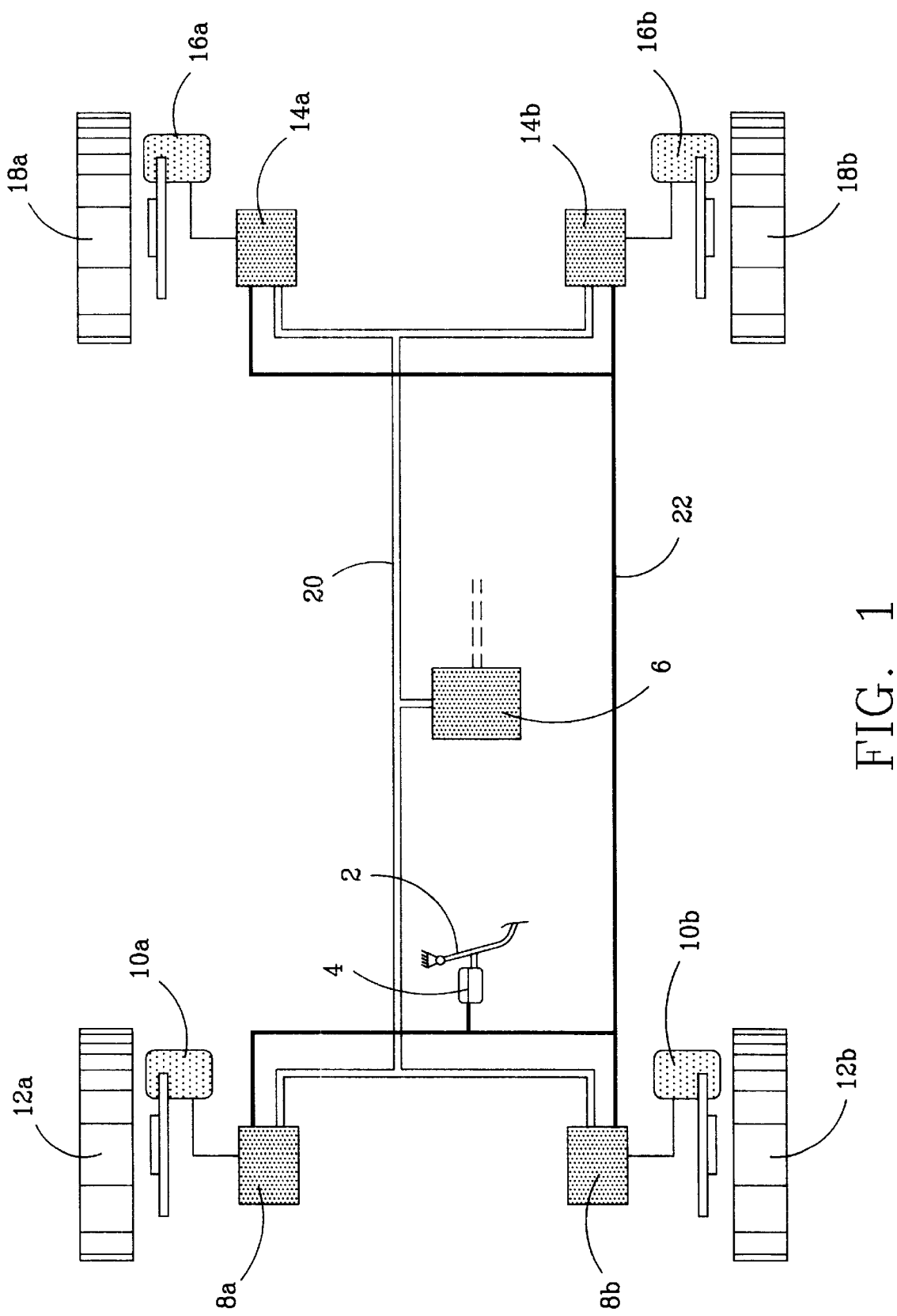
FIG. 1 is a schematic of a brake system according to the invention.

FIG. 1 is a schematic representation of a brake system of the brake-by-wire type wherein only those components are shown which are needed for explaining the invention. The brake system includes a brake pedal 2 having a sensor 4 which converts the brake command into an electrical signal S. The brake command is transmitted by the driver via the force applied by the foot which works on the brake pedal 2. In addition, the brake system includes a central unit 6 and computing units 8a and 8b of the brake actuators 10a and 10b which are assigned to the front wheels 12a and 12b. Correspondingly, the brake system includes computing units 14a and 14b of the brake actuators 16a and 16b which are assigned to the rear wheels 18a and 18b. The brake system also includes a serial data bus 20 via which the central unit 6 exchanges data with the computing units 8a, 8b, 14a and 14b. Furthermore, the brake system includes a signal line 22 via which the brake signal S can be transmitted from the sensor 4 to the computing units 8a, 8b, 14a and 14b.

The operation of the brake system shown in FIG. 1 will be explained below in connection with FIG. 2. In a braking operation, the pedal signal S generated by the sensor 4 is transmitted via the separate signal line 22 to the computing units 8a, 8b, 14a and 14b. The simultaneous arrival of the pedal signal S at the computing units 8a, 8b, 14a and 14b is ensured via an analog or quasi analog signal path between the sensor 4 and the individual computing units 8a, 8b, 14a and 14b. A braking-force distribution key BS (comprised of the components $K_1$ to $K_4$) is stored already in the individual computing units 8a, 8b, 14a and 14b. The individual components of the braking-force distribution key BS indicate the relative braking force which would be controlled at the corresponding brake actuator during a braking operation triggered by actuating the brake pedal 2 (a braking-force distribution key could, for example, appear as follows: 45/100; 25/100; 20/100 and 10/100). This would mean that, for a braking operation, the braking force is controlled to the following percentages: at the wheel 12a 45%, at the wheel 12b 25%, at the wheel 18a 20% and at the wheel 18b 10% of the total braking force defined by the pedal signal S.

The brake force F to be controlled at the individual brake actuators 10a, 10b, 16a and 16b is computed in the individual control units 8a, 8b, 14a and 14b from the product of the pedal signal S and the corresponding component of the braking-force distribution key. Computing unit 8a is assigned to the brake actuator 10a which brakes the front wheel 12a (see FIG. 1). In this computing unit 8a, the absolute braking force $F_1$ is computed from the product pedal signal S and the component $K_1$ of the braking-force distribution key BS. The same applies to the other computing units 8b, 14a and 14b and the brake actuators associated therewith.

The braking-force distribution key BS is stored in the computing units 8a, 8b, 14a and 14b and is replaced in time-dependent intervals by a new braking-force distribution key BS'. The new braking-force distribution key BS' is computed in the central unit 6 on the basis of different data and is transmitted simultaneously via the serial data bus 20 to the computing units 8a, 8b, 14a and 14b where the new braking-force distribution key BS' replaces the old braking-force distribution key BS. After storing the new braking-force distribution key BS', the computation of the individual braking forces is performed on the basis of the new braking-force distribution key BS'. (The above braking-force distribution key (45/100; 25/100; 20/100; 10/100) is exemplary and is replaced, for example, by the new braking-force distribution key (20/100; 40/100; 15/100; 25/100) so that the wheels 12a and 18a of the right side of the motor vehicle are no longer braked with greater intensity than the wheels 12b and 18b on the left-hand side of the motor vehicle but instead oppositely. Such a change of the braking-force distribution key can, for example, be caused by a change of the surface of the roadway).

Figure 2:
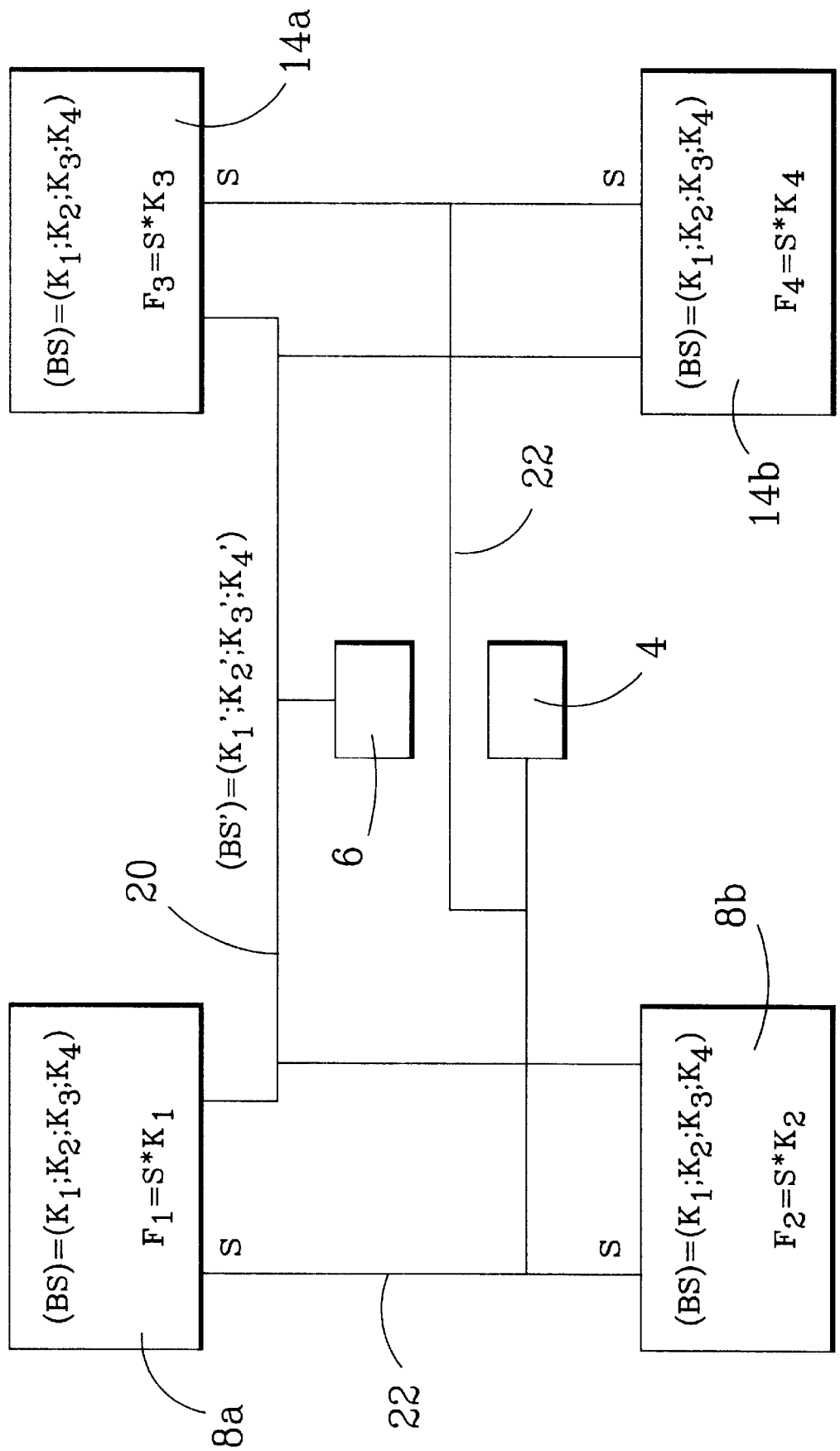
FIG. 2 is a block diagram explaining the operation of the brake system shown in FIG. 1; and, FIG. 3 is a block diagram showing the brake system.
Figure 3:
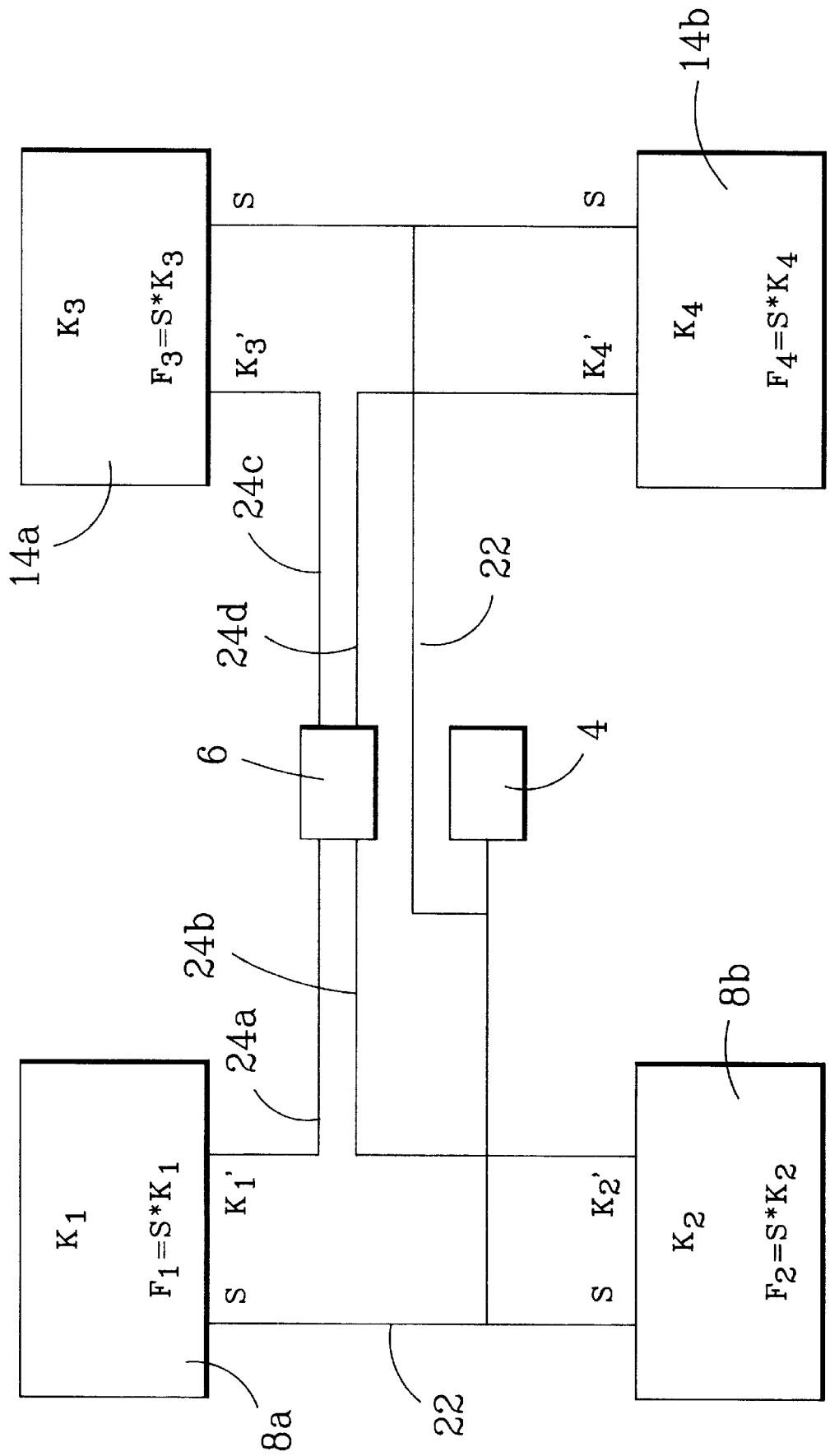

In the brake system shown in FIG. 3, the computation of the individual brake forces F takes place in the computing units 8a, 8b, 14a and 14b in the same manner as it was already explained with respect to FIG. 2. The only difference to FIG. 2 is that the central unit 6 is not connected via a serial data bus to the corresponding computing units 8a, 8b, 14a and 14b as shown in FIG. 2; instead, the central unit 6 is connected via individual signal lines 24a, 24b, 24c and 24d to the corresponding computing units 8a, 8b, 14a and 14b. A new braking-force distribution key BS' (comprising $K_1'$ to $K_4'$) is also computed at time intervals and the individual components of the braking-force distribution key are now transmitted via the corresponding signal lines 24a, 24b, 24c and 24d to the corresponding computing units 8a, 8b, 14a and 14b. The simultaneous arrival of the components is ensured because of the nature of the signal transmission on the signal lines 24a, 24b, 24c and 24d. The new components $K_1'$ to $K_4'$ replace the stored components $K_1$ to $K_4$ of the old braking-force distribution key BS in the corresponding computing units 8a, 8b, 14a and 14b and, starting with the time point of the replacement, the new braking forces F are computed on the basis of the new components $K_1'$ to $K_4'$.

It is understood that the foregoing description is that of the preferred embodiments of the invention and that various changes and modifications may be made thereto without departing from the spirit and scope of the invention as defined in the appended claims.

What is claimed is:

1. A method for operating an electric brake system of a motor vehicle having a plurality of wheels, the method comprising the steps of:

providing a brake pedal and sensor assembly for generating a pedal signal (S) which defines a total braking force;

providing a plurality of brake actuators for corresponding ones of said wheels;

providing a plurality of computing units operatively connected to respective ones of said brake actuators;

providing a central unit connected to respective ones of said computing units so as to permit said control unit to transmit data to said computing units;

the method further including the following steps which are carried out independently of actuating said electric brake system:

computing a new braking-force distribution key (BS') in said central unit at time intervals and said braking-force distribution key (BS') having a plurality of new components (Ki') assigned to corresponding ones of said brake actuators and each of said new components (Ki') defining a relative braking force to which the brake actuator assigned thereto is to be controlled to during a braking operation of said electric brake system;

transmitting said new components (Ki') for said brake actuators, respectively, to corresponding ones of said computing units wherein said new components (Ki') replace respective old components (Ki) stored therein;

and, when said brake pedal is actuated, the following additional method steps are carried out:

conducting said pedal signal (S) directly to said computing units of said brake actuators, respectively;

in each of said computing units, computing an absolute braking force from a product of the then stored component (Ki') and said pedal signal (S); and, applying the absolute braking force computed in each computing unit to the brake actuator corresponding thereto.

2. The method of claim 1, wherein a new braking-force distribution key (BS') is periodically computed.

3. The method of claim 1, wherein a new braking-force distribution key (BS') is computed when a change of the driving situation of said motor vehicle is determined.

4. The method of claim 1, the method comprising the further step of replacing the last stored component (Ki) in each computing unit with a fixed pregiven value when the corresponding new components (Ki') are not transmitted to said computing units corresponding thereto within a pre-given time span.

5. An electrical brake system for a motor vehicle, the electrical brake system comprising:

a brake pedal and sensor assembly for generating a pedal signal (S) defining a total braking force;

a plurality of brake actuator units for corresponding ones of the wheels of said motor vehicle;

a plurality of computing units operatively connected to respective ones of said brake actuator units;

a central unit for computing a braking-force distribution key (BS);

said central unit being connected to corresponding ones of said computing units for transmitting data thereto;

said central unit functioning to compute a new braking-force distribution key (BS') having a plurality of new components (Ki') assigned to corresponding ones of said brake actuators and each of said new components (Ki') defining a relative braking force to which the brake actuator assigned thereto is to be controlled during a braking action of said electric brake system;

said control unit further functioning to transmit said new components (Ki') for said brake actuators, respectively, to corresponding ones of said computing units wherein said new components (Ki') replace respective old components (Ki) stored therein;

each of said computing units having an overwrite memory wherein the new component (Ki') corresponding to the computing unit can be stored at any time point;

each of said computing units functioning to compute an absolute braking force from a product of the corresponding stored component (Ki') and said pedal signal (S); and, signal line means for transmitting said pedal signal (S) directly to said computing units.

* * * * *